US008924416B2

(12) United States Patent
Sedlar et al.

(10) Patent No.: US 8,924,416 B2
(45) Date of Patent: *Dec. 30, 2014

(54) TYPE SYSTEM FOR BUILDING EXTENSIBLE BUSINESS APPLICATIONS

(71) Applicant: Oracle International Corporation, Redwood Shores, CA (US)

(72) Inventors: Eric Sedlar, Portola Valley, CA (US); Aman Naimat, San Francisco, CA (US); Ravi Murthy, Saratoga, CA (US); Doug McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,033

(22) Filed: Jun. 20, 2013

(65) Prior Publication Data

US 2013/0346438 A1  Dec. 26, 2013

Related U.S. Application Data

(63) Continuation of application No. 12/782,591, filed on May 18, 2010, now Pat. No. 8,473,506.

(60) Provisional application No. 61/180,079, filed on May 20, 2009.

(51) Int. Cl.
 *G06F 17/30* (2006.01)
(52) U.S. Cl.
 CPC .... *G06F 17/30424* (2013.01); *G06F 17/30923* (2013.01)
 USPC .......................................... 707/769; 707/790
(58) Field of Classification Search
 USPC ................... 707/769, 713, 694, 690, 639, 790
 See application file for complete search history.

(56) References Cited

U.S. PATENT DOCUMENTS

| 7,293,038 | B2 * | 11/2007 | Blevins et al. ........................ 1/1 |
| 7,614,052 | B2 * | 11/2009 | Wei ............................... 717/176 |
| 7,831,620 | B2 * | 11/2010 | Barsness et al. ............... 707/790 |
| 7,904,326 | B2 | 3/2011 | Gharavy |
| 7,958,077 | B2 | 6/2011 | Vescovi et al. |
| 7,974,966 | B2 * | 7/2011 | Robie ........................... 707/713 |
| 8,515,988 | B2 * | 8/2013 | Jones et al. ................... 707/769 |
| 8,560,564 | B1 * | 10/2013 | Hoelzle et al. ................ 707/769 |
| 2010/0070500 | A1 | 3/2010 | Cui et al. |
| 2014/0075285 | A1 | 3/2014 | Blas et al. |
| 2014/0237345 | A1 | 8/2014 | Blas et al. |

* cited by examiner

*Primary Examiner* — James Trujillo
*Assistant Examiner* — Thong Vu
(74) *Attorney, Agent, or Firm* — Hickman Palermo Truong Becker Bingham Wong LLP

(57) ABSTRACT

A platform (referred to herein as Extensible Application Platform, or XAP) for developing extensible business applications. In one set of embodiments, XAP can include an Extensible Markup Language (XML) based application model that is designed to support a high degree of application extensibility. For example, the XAP application model can support declarative definition of application semantics, separation of application data and metadata, and a flexible type system that allows constraints and calculations (e.g., XQuery constraints and calculations) for a data object instance (e.g., an XML document) to change over time. In certain embodiments, the XAP application model can be implemented via a server-side database/application engine that is configured to interoperate with a spreadsheet-like, client-side user interface. Using the spreadsheet-like UI, a non-programmer can build, customize, and run an application workflow that operates on top of a shared database like a traditional business application.

20 Claims, 6 Drawing Sheets

TYPE SYSTEM FOR BUILDING EXTENSIBLE BUSINESS APPLICATIONS

CROSS-REFERENCES TO RELATED APPLICATIONS

This application is a continuation of U.S. application Ser. No. 12/782,591, filed May 18, 2010, which claims the benefit of U.S. Provisional Application No. 61/180,079, filed May 20, 2009. The contents of both U.S. application Ser. No. 12/782,591, filed May 18, 2010, and U.S. Provisional Application No. 61/180,079, filed May 20, 2009, are hereby incorporated by reference in their entirety for all purposes, as if set forth herein. The applicant(s) hereby rescind any disclaimer of claim scope in the parent application(s) or the prosecution history thereof and advise the USPTO that the claims in this application may be broader than any claim in the parent application.

BACKGROUND

The present disclosure relates in general to computer software, and in particular to a platform for building extensible business applications.

Many enterprises today have two ecosystems for managing electronic information—a database ecosystem in which information is captured and maintained in a shared database through the use of specialized, and often complex, software applications (referred to herein as traditional business applications), and a spreadsheet ecosystem in which information is exchanged among individuals, typically in an ad-hoc manner, using spreadsheets.

The database ecosystem is particularly suited to a shared enterprise environment because information is stored centrally and thus can be accessed by multiple users for viewing, modification, analysis, auditing, reporting, and other functions. In addition, the traditional business applications that serve as the front-end for data entry are typically designed to support features (e.g., security, workflows, etc.) that are useful in a business context. However, a significant disadvantage of this ecosystem is that traditional business applications generally cannot be built or customized by non-programmers (e.g., end-users). As a result, such users are limited to entering and managing the specific classes of data that these applications were originally programmed to support.

In the spreadsheet ecosystem, users have the flexibility to enter and keep track of any kind of data that suits their particular needs. For example, with a conventional spreadsheet application such as Microsoft Excel, users can easily enter, modify, and re-arrange data in any cell or group of cells. Further, since spreadsheets are inherently data-centric rather than code-centric, users without any programming expertise can build and customize spreadsheets to carry out various tasks. This makes spreadsheets an attractive and accessible data management tool for a wide range of users. However, spreadsheets do not support data storage/retrieval from a shared database or other business-oriented features, thereby limiting their usefulness in a multi-user enterprise setting.

Accordingly, it would be desirable to have techniques for building a new class of applications that combine aspects of spreadsheets and traditional, database-driven business applications.

BRIEF SUMMARY

Embodiments of the present invention provide a platform (referred to herein as Extensible Application Platform, or XAP) for developing extensible business applications. In one set of embodiments, XAP can include an Extensible Markup Language (XML) based application model that is designed to support a high degree of application extensibility. For example, the XAP application model can support declarative definition of application semantics, separation of application data and metadata, and a flexible type system that allows constraints and calculations (e.g., XQuery constraints and calculations) for a data object instance (e.g., an XML document) to change over time. In certain embodiments, the XAP application model can be implemented via a server-side database/application engine that is configured to interoperate with a spreadsheet-like, client-side user interface. Using the spreadsheet-like UI, a non-programmer can build, customize, and run an application workflow that operates on top of a shared database like a traditional business application.

According to one embodiment of the present invention, a method for validating a data object instance, such as an XML document instance, is provided. The method includes storing by a computer system a set of XQuery states for an XML document, and determining by the computer system a first subset of the set of XQuery states at a first point in time. An instance of the XML document is then validated against the first subset, without validating the instance against XQuery states not in the first subset, at the first point in time.

In one embodiment, the method further includes determining a second subset of the set of XQuery states at a second point in time, where the second subset is different from the first subset. The instance is then validated against the second subset, without validating the instance against XQuery states not in the second subset, at the second point in time.

In one embodiment, the method further includes storing a type for the XML document and automatically validating the instance against the type at both the first point in time and the second point in time.

In one embodiment, each state in the set of XQuery states is stored as a separate XML document.

In one embodiment, each XQuery state in the set of states defines a set of XQuery constraints, and validating the instance against the first subset includes checking the instance against the sets of XQuery constraints defined by the first subset. In a further embodiment, each XQuery constraint is a side-effect free Boolean expression.

In one embodiment, at least one XQuery state in the set of XQuery states is a child of another XQuery state in a hierarchy, and the set of XQuery constraints defined by the at least one XQuery state includes an XQuery constraint inherited from the another XQuery state.

In one embodiment, at least one XQuery state in the set of XQuery states defines a set of XQuery calculations, and validating the instance against the first subset includes performing sets of XQuery calculations defined by the first subset. In a further embodiment, results of the sets of XQuery calculations are stored in one or more fields of the instance.

In one embodiment, if the instance is successfully validated at the first point in time, the instance is marked with information indicating that the instance is valid with respect to the first subset.

According to another embodiment of the present invention, a computer-readable storage medium having stored thereon program code executable by a computer system is provided. The program code includes code that causes a computer system to store a set of XQuery states for an XML document, and to determine a first subset of the set of XQuery states for validating an instance of the XML document at a first point in time. The program code further includes code that causes the computer system to validate the instance against the first subset, without validating the instance against XQuery states not in the first subset, at the first point in time.

According to another embodiment of the present invention, a system is provided. The system comprises a processing component configured to store a set of XQuery states for an XML document and determine a first subset of the set of XQuery states for validating an instance of the XML document at a first point in time. The processing component is further configured to validate the instance against the first subset, without validating the instance against XQuery states not in the first subset, at the first point in time.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide a platform (referred to herein as Extensible Application Platform, or XAP) for developing extensible business applications. In one set of embodiments, XAP can include an Extensible Markup Language (XML) based application model that is designed to support a high degree of application extensibility. For example, the XAP application model can support declarative definition of application semantics, separation of application data and metadata, and a flexible type system that allows constraints and calculations (e.g., XQuery constraints and calculations) for a data object instance (e.g., an XML document) to change over time. In certain embodiments, the XAP application model can be implemented via a server-side database/application engine that is configured to interoperate with a spreadsheet-like, client-side user interface. Using the spreadsheet-like UI, a non-programmer can build, customize, and run an application workflow that operates on top of a shared database like a traditional business application.

1. XAP System Architecture

Figure 1:
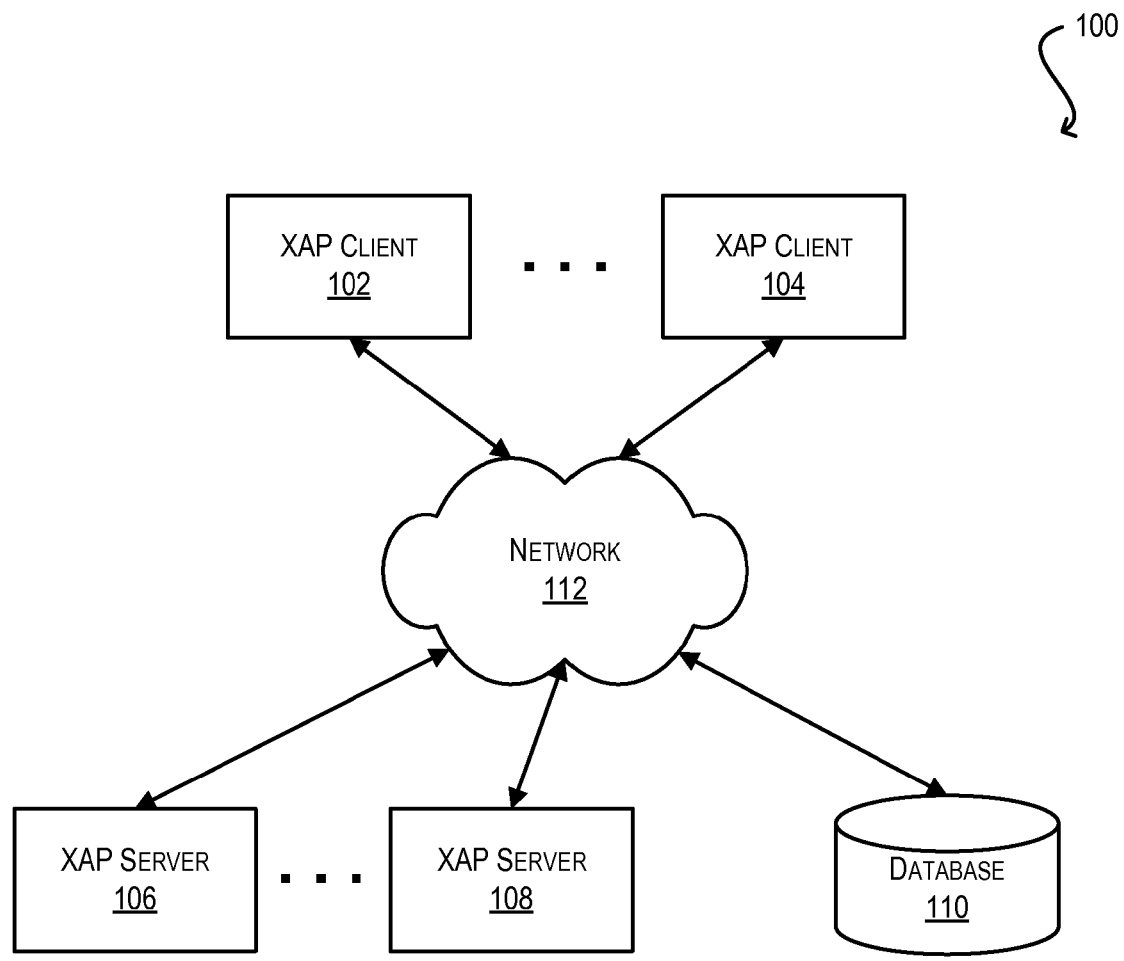
FIG. 1 is a simplified block diagram of a system architecture that can be used in accordance with an embodiment of the present invention.

FIG. 1 is a simplified block diagram of a system architecture 100 that can be used in accordance with an embodiment of the present invention. As shown, system architecture 100 can include one or more clients 102, 104, one or more servers 106, 108, and one or more databases 110 communicatively coupled via a network 112. Although FIG. 1 depicts two clients, two servers, and one database, any number of clients, servers, and databases can be supported.

Clients 102, 104 are configured to render a spreadsheet-like, client-side UI (referred to herein as XAP UI) for building and running XAP applications. In one set of embodiments, the XAP UI can be programmed using a Web-based technology such as AJAX or Adobe Flex; in these cases, clients 102, 104 can render the XAP UI in a conventional Web browser application. In other embodiments, the XAP UI can be rendered in a proprietary client application. Clients 102, 104 can be general purpose computers, such as desktop or laptop computers running a version of Microsoft Windows, Apple OS X, or another consumer operating system. Clients 102, 104 can also be any other type of electronic device (e.g., a smart phone, PDA, tablet, netbook, or the like) that is capable of communicating over a network and interacting with servers 106, 108.

Servers 106, 108 are configured to execute the server-side XAP application/database engine and provide various computational and data storage services to clients 102, 104. In certain embodiments, servers 106, 108 can be part of a scalable server cloud. Like clients 102, 104, servers 106, 108 can be general purpose computers that run any of a variety of consumer operating systems. Servers 106, 108 can also be specialized server computers, such as rack-mounted servers, that are configured to run a server-oriented operating system (e.g., Solaris, FreeBSD, Linux, etc.).

Servers 106, 108 can receive and process a number of different types of XAP service requests from clients 102, 104. In one embodiment, servers 106, 108 can receive and process requests for generating portions of the XAP UI rendered by clients 102, 104. In another embodiment, servers 106, 108 can receive and process requests for executing various XAP application semantics. For example, as described in further detail below, users can define types and states on application data objects (e.g., XML documents), where each type or state includes a set of constraints and/or calculations (e.g., XQuery constraints/calculations). Servers 106, 108 can execute these constraints and calculations (via, e.g., an XQuery engine) and provide the results to clients 102, 104.

In yet another embodiment, servers 106, 108 can receive and process requests for storing and/or retrieving information from shared database 110. Generally speaking, database 110 serves as the central data store for all XAP application data and metadata. In a particular embodiment, database 110 can be implemented as an XML-based database, and all XAP data and metadata can be encapsulated as XML documents. This allows for a number of advantages over alternatives such as SQL-based storage. For example, XML-based storage supports data schema changes without requiring changes to XML document instances, and allows for user variations of XML documents to co-exist. XML-based storage also supports unstructured, semi-structured, and highly structured data. These features facilitate customizability at the application model level, which is an important aspect of XAP.

In the embodiment of FIG. 1, database 110 resides, as a single logical instance, in one or more machines separate from servers 106, 108. For example, database 110 can reside in a separate Oracle RDBMS server. In this embodiment, servers 106, 108 can communicate with database 110 via an RDBMS protocol such as Oracle Callable Interface (OCI). In alternative embodiments, database 110 can be implemented in a distributed fashion, where the database is divided into a number of separate (logical) instances that reside in servers 106, 108 (and in other servers in the server cloud). According to this design, each server can be responsible for storing and managing a portion of the overall data store.

In implementations where the interaction between the XAP client side and server side is Web-based, clients 102, 104 can communicate with servers 106, 108 via HTTP requests. Further, the processing performed by servers 106, 108 can be implemented within a Web server module such as Apache. In implementations where the interaction between the XAP client side and server side is based on proprietary technology, clients 102, 104 and servers 106, 108 can communicate via a custom protocol.

Network 112 can be any type of data communications network such as a local area network (LAN), a wide-area network (WAN), a virtual network (e.g., VPN), or the Internet. In certain embodiments, the various components of system architecture 100 can communicate over different types of networks. For example, in one embodiment clients 102, 104 can communicate with servers 106, 108 via the Internet, and servers 106, 108 can communicate with database 110 via a secure, local area network (e.g., an enterprise intranet).

It should be appreciated that system architecture 100 is illustrative and is not intended to limit embodiments of the present invention. For example, in one alternative embodiment, the computing and data storage functions of servers 106, 108 can be segregated into two different types of servers—computing servers and storage servers. Thus, computing and storage management resources can be scaled independently via separate computing and storage clouds. In another alternative embodiment, portions of the processing performed by servers 106, 108 can be handled by clients 102, 104, and the clients can interact directly with database 110. One of ordinary skill in the art would recognize other variations, modifications, and alternatives.

Figure 2:
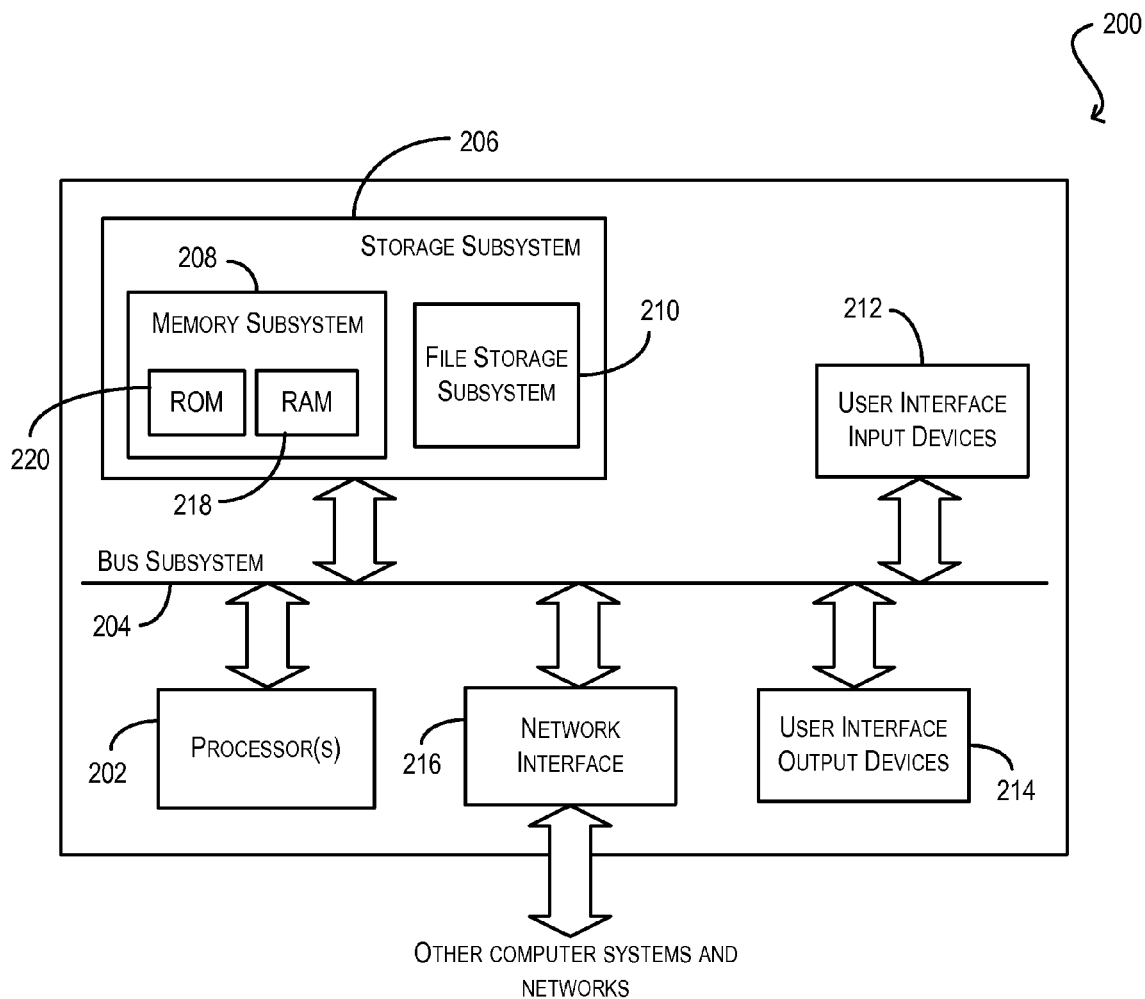
FIG. 2 is a simplified block diagram of a computer system that can be used in accordance with an embodiment of the present invention.

FIG. 2 is a simplified block diagram of a computer system 200 that can be used in accordance with an embodiment of the present invention. For example, computer system 200 can be used to implement any of the clients or servers 102, 104, 106, 108 illustrated in FIG. 1. As shown in FIG. 2, computer system 200 can include one or more processors 202 that communicate with a number of peripheral devices via a bus subsystem 204. These peripheral devices can include a storage subsystem 206 (comprising a memory subsystem 208 and a file storage subsystem 210), user interface input devices 212, user interface output devices 214, and a network interface subsystem 216.

Bus subsystem 204 can provide a mechanism for letting the various components and subsystems of computer system 200 communicate with each other as intended. Although bus subsystem 204 is shown schematically as a single bus, alternative embodiments of the bus subsystem can utilize multiple busses.

Network interface subsystem can 216 serve as an interface for communicating data between computer system 200 and other computer systems or networks (e.g., network 112 of FIG. 1). Embodiments of network interface subsystem 216 can include an Ethernet card, a modem (telephone, satellite, cable, ISDN, etc.), digital subscriber line (DSL) units, and the like.

User interface input devices 212 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 200.

User interface output devices 214 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 200.

Storage subsystem 206 can include a memory subsystem 208 and a file/disk storage subsystem 210. Subsystems 208 and 210 represent computer-readable storage media that can store program code and/or data that provide the functionality of the present invention.

Memory subsystem 208 can include a number of memories including a main random access memory (RAM) 218 for storage of instructions and data during program execution and a read-only memory (ROM) 220 in which fixed instructions are stored. File storage subsystem 210 can provide persistent (i.e., non-volatile) storage for program and data files, and can include a magnetic or solid-state hard disk drive, a floppy disk drive along with associated removable media, an optical drive along with associated removable media (e.g., CD-ROM, DVD, Blu-Ray, etc.), a removable flash memory-based drive or card, and/or other types of storage media known in the art.

It is should be appreciated that computer system 200 is illustrative and not intended to limit embodiments of the present invention. Many other configurations having more or fewer components than system 200 are possible.

2. XAP Application Model

The following sections describe components of the XAP application model. The application model can include, inter alia, data structure constructs (e.g., elements, types, states), grouping constructs (e.g., documents), and other application-level constructs (e.g., constraints, calculations, links, activities) that form the basis of an XAP application. In one set of embodiments, many of these components can be defined declaratively via a spreadsheet-like UI, thereby allowing users that are familiar with spreadsheets (but may not have programming expertise) to build and run XAP applications.

In various embodiments, the XAP application model is designed to promote a high degree of customization and minimize instances where changes to application data structure (e.g., adding a new data object, modifying business rules that apply to a existing data object, etc.) require modifications to program code. In addition, the application model is designed to promote sharing and reuse of components across XAP applications. These design principles are reflected in aspects of the model described below.

2.1. Elements

An element is an XAP data structure construct that associates a name (and thus, a semantic meaning) with a piece of data. If two element instances share the same element name, they can be considered comparable. In one set of embodiments, XAP elements can be represented as XML elements. For example, an XAP element name can correspond to an XML element name, and data within an XAP element instance can correspond to data enclosed within the tags of an XML element. In addition, XAP elements (as well as other XAP model entities) can be named using conventional XML namespaces. Accordingly, an XAP element name can be composed of a namespace (e.g., "http://xap.oracle.com/demo/store" or "store" as shorthand) and a local name within the namespace (e.g., "order" for a purchase order data object).

In one set of embodiments, an XAP element can be a scalar element or a structure element. An XAP scalar element is an element that contains a single piece of data. Thus, a scalar element can be considered an atomic data object. In a particular embodiment, a scalar element can correspond to a single data field in the XAP UI. The following is an example of a scalar element instance (defined using XML tags) that stores the value of a U.S. zip code:

<store:zipcode>90210</store:zipcode>

In certain embodiments, a scalar element can be associated with a scalar datatype. The scalar datatype can act as a hint to the XAP application/database engine on how to store and index instances of that element. If the instance data for a scalar element cannot be converted into a specified scalar datatype, the data can be stored as a string. Examples of scalar datatypes supported by XAP include:

Empty—An empty element conveys information by its presence or absence. These are also referred to as flag elements.

Boolean—A boolean element contains a true/false value. For collation purposes, true sorts after false.

Integer—An integer contains a two's complement integer up to, e.g., 64 bits in size (constraints can be used to restrict this to a smaller size).

Float—A float contains a floating-point value. Floating-point numbers and integers can be collated in the same manner (numerically).

Decimal—A decimal contains a floating-point value represented using base-10 digits with infinite precision. Numeric collation.

String—A string contains an array of zero or more Unicode (UTF8) characters. String values are collated in UTF8 binary order in a value index.

Binary—A binary contains an array of zero or more 8-bit bytes. Binary collation.

Date—A date contains a Gregorian calendar date consisting of year, month, and date. Temporal collation.

Time—A time contains hours, minutes, seconds, and fractional seconds. Temporal collation.

Link—A link is an XAP construct that provides a reference to another (structure) element instance.

An XAP structure element is an element that contains one or more other scalar or structure elements. Thus, a structure element can be considered a hierarchical data object. In a particular embodiment, a structure element can correspond to a row of data (comprising multiple data fields) in the XAP UI. The following is an example of a structure element instance for a U.S. style address that includes "line," "city," and "zipcode" scalar elements:

```
<store:address>
    <store:line>ABC Avenue</store:line>
    <store:line>Apt. 123</store:line>
    <store:city>Beverly Hills</store:city>
    <store:zipcode>90210</store:zipcode>
</store:address>
```

In one set of embodiments, each instance of a structure element can be represented and stored as a separate XAP document (e.g., an XML document) in the shared XAP database (e.g., database 110 of FIG. 1). XAP documents are discussed in greater detail in the "Documents" section below.

In addition, each structure element can be associated with an XAP type and one or more XAP states. Generally speaking, the XAP type of a structure element can define an invariant set of rules (i.e., constraints) that are used to validate an instance of the element throughout its lifecycle, and the XAP states of a structure element can define sets of rules that are only used to validate the element instance at certain times. XAP types and states are discussed in greater detail in the "Types and States" section below.

In one set of embodiments, XAP element names can be unique within the shared XAP database, and thus can have global scope within the community of all XAP applications. This promotes the sharing and reuse of element names across applications. For example, if a user creates an element named "xap:address" in one XAP application, that element name can be visible (and available for reuse) by other users creating other XAP applications. In addition, the shared element can have the same semantics (e.g., data structure, types, states) in each application. This enables a number of benefits/features, such as consistent behavior/appearance of common data objects across applications, and automatic data merging based on element names.

2.2. Documents

An XAP document is a grouping construct that is used to organize XAP data (e.g., element instances) and XAP metadata (e.g., type and state definitions). In one set of embodiments, an XAP document can be represented as an XML document. An XAP document can be considered the unit of isolation and atomic change in the XAP system. Accordingly, when an XAP application is working on/modifying one document, the application can be sure that all of the information within that document is internally consistent.

In various embodiments, all XAP documents can be stored in the shared XAP database and can be accessible via a virtual file system interface. In one embodiment, a new document can be created and stored by the XAP application/database engine for each instance of a structure element created by a user. The following is an example XML document that encapsulates data for a "store:order" element instance:

```
<?xml version="1.0" encoding="ISO-8859-1"?>
<store:order xmlns:xap="http://xap.oracle.com"
        xmlns:xlink="http://www.w3.org/1999/xlink"
        xmlns:store="http://xap.oracle.com/demo/store">
    <store:ordernumber>12345</store:ordernumber>
    <store:date>2008-08-08</store:date>
    <store:name>Herman Munster</store:name>
    <store:shipto xlink:href="/customers/munster.xml#_001"/>
    <store:orderline xap:id="_001">
        <store:item xlink:href="/products/widget.xml"/>
        <store:price>10.00</store:price>
        <store:quantity>2</store:quantity>
        <store:total>20.00</store:total>
    </store:orderline>
    <store:orderline xap:id="_002">
        <store:item xlink:href="/products/grommet.xml"/>
        <store:price>20.00</store:price>
        <store:quantity>1</store:quantity>
        <store:total>20.00</store:total>
    </store:orderline>
    <store:total>40.00</store:total>
</store:order>
```

XAP documents can also be created and stored for XAP metadata definitions (i.e., data that describes the semantics of XAP data or an XAP application flow) that are declaratively defined by users. Examples of such metadata definitions include types, states, and activities. In one embodiment, XAP metadata definitions can be stored in XML documents that are separate from XAP element instances. This approach minimizes dependencies between data structure and data, which in turn facilitates application customization.

Beyond user-defined data and metadata, each XAP document can further include system metadata that resides in a separate XML element tree. The system metadata can include, for example, the document's creator, modification date, access permissions (ACL), and size (in bytes). The system metadata can also identify lists of types/states that have been validated against the document, and lists of errors that were found.

In one set of embodiments, XAP documents can be versioned according to two levels—major and minor versions. A major version can be created whenever an XAP document is "published" via the XAP UI, and corresponds to a document change that is visible to other users. If other users are in the process of modifying a document when a major version is created, those users may need to merge their changes into the new major version.

Minor versions of a document can be created automatically or manually via the XAP UI client, and correspond to personal savepoints for the user editing the document. The changes captured in a minor version are not visible to other users, and will not be made visible until the changes are published and a new major version is created.

In one set of embodiments, the shared XAP database can maintain copies of all prior major versions of a document. As described in the "Constraints" section below, this allows XAP applications to reference historic data in XAP documents as they existed at a particular point in time.

2.3. Links

A link is a type of XAP scalar element that references a structure element instance stored in an XAP document separate from the document/element instance containing the link. Links can be useful for referencing data that is shared in multiple element instances, without having to duplicate the data in each instance. In one set of embodiments, XAP links can be represented via conventional XML XLinks.

The "store:order" document shown in the "Documents" section above includes three links (highlighted below):

```
<store:order xmlns:xap="http://xap.oracle.com"
        xmlns:xlink="http://www.w3.org/1999/xlink"
        xmlns:store="http://xap.oracle.com/demo/store">
    <store:ordernumber>12345</store:ordernumber>
    <store:date>2008-08-08</store:date>
    <store:name>Herman Munster</store:name>
    <store:shipto xlink:href="/customers/munster.xml#_001"/>
    <store:orderline xap:id="_001">
        <store:item xlink:href="/products/widget.xml"/>
        <store:price>10.00</store:price>
        <store:quantity>2</store:quantity>
        <store:total>20.00</store:total>
    </store:orderline>
    <store:orderline xap:id="_002">
        <store:item xlink:href="/products/grommet.xml"/>
        <store:price>20.00</store:price>
        <store:quantity>1</store:quantity>
        <store:total>20.00</store:total>
    </store:orderline>
    <store:total>40.00</store:total>
</store:order>
```

In this example, the "store:order" element instance includes a link to the shipping address of a customer that is stored in "customers/munster.xml#_0001." Further, the "store:order" element instance includes links to two separate item descriptions stored in "products/widget.xml" and "products/grommet.xml" respectively.

In one set of embodiments, an XAP link can point (by default) to the most current major version of a referenced document. This behavior can be changed by constraining the link to point to a specific historic version (identified by a version number).

One issue with using conventional XLinks to implement XAP links is that XLinks are not reversible. To address this, XAP can include a built-in function called xap:getInLinks( ) that provides for reverse navigation from a particular target element. In one set of embodiments, xap:getInLinks( ) can take as arguments (1) the target element, and (2) the kinds of links to be found. For example, the following code can be used to find all of the orders shipped to a particular address:
$x:=xap:getInLinks($address, 'store:order/store:shipto')

2.4. Types and States

A conventional type system provides a name for a class of data, along with a list of rules or constraints that limit the kinds of data that can be in that class. Type systems are useful in the sense that they can codify assumptions about data that program code would like to make, thereby making the code less complex. However, existing type systems have a number of faults that can make aspects of application development (and, in particular, application customization) difficult.

First, existing type systems assume that each data object (e.g., XML document) has a single type, and that the type is immutable. Thus, the constraints that apply to a data object cannot be modified over time. This can be problematic in several different scenarios. As one example, consider an "order" object that flows through a purchase order workflow. The order object can go through a number of different workflow phases, such as "new," "billed," "shipped," and "closed." From a business perspective, the order object can require different fields and/or constraints to be present at different phases (e.g., a tracking number at the shipped phase) for the order object to be properly validated. However, this type of dynamic modification of constraints cannot be supported via a single, static type.

As another example, consider an application that is initially developed to store a single "SSN" (Social Security Number) attribute for a "person" object (under the assumption that each person only has a single SSN). After the application is deployed, a person who has a problem with identity theft can be entered into the application, and that person can have a second SSN assigned to her. In this case, the application needs to be modified to support a second SSN attribute in the "person" object. However, this type of customization also cannot be supported (without a rewrite of application code) via a single, static type.

A second problem with existing type systems is that type definitions are typically closely integrated with program code and/or data. For example, in many cases, types are defined programmatically rather than declaratively. This makes it difficult for non-programmers to make type modifications, since the affected program code needs to be rewritten and recompiled. In further instances, type definitions are often stored together with the data that they relate to. This generally allows for some optimization when storing or accessing the data, but requires all existing data instances to be touched when a type modification is made.

The XAP application model provides a flexible type system that overcomes these and other similar problems. In one set of embodiments, the XAP type system can include two different typing constructs: types and states. Both constructs can have a name and a set of constraints that need to be satisfied in order for the type/state to be valid with respect to a data object instance (i.e., an element instance/XML document instance). An XAP type is similar to a traditional type in that an XAP element instance can only be associated with one XAP type, and the XAP type is "active" (i.e., the type constraints are enforced) throughout the instance's lifecycle. However, an XAP element instance can also be associated with multiple XAP states, and one or more XAP states can be active or inactive for the instance at various points in the instance's lifecycle. With this state-based paradigm, an XAP application can apply varying sets of constraints to an element instance over time.

In one set of embodiments, the constraints included in an XAP type/state can be expressed as XQuery expressions. Accordingly, XAP type/states are also referred to herein as XQuery types/states.

In certain embodiments, XAP types and states can be defined declaratively (rather than programmatically), and can be stored in XAP documents (e.g., XML documents) that are separate from the element data they relate to. Accordingly, the application semantics captured in XAP types and states can be defined/customized by non-programmers without requiring a rewrite of program code or modification of existing element instances. In one embodiment, once a type or state has been created by a user, that type or state can be automatically made available (via the shared XAP database) with the entire community of XAP users for reuse or customization in other XAP applications.

Figure 3:
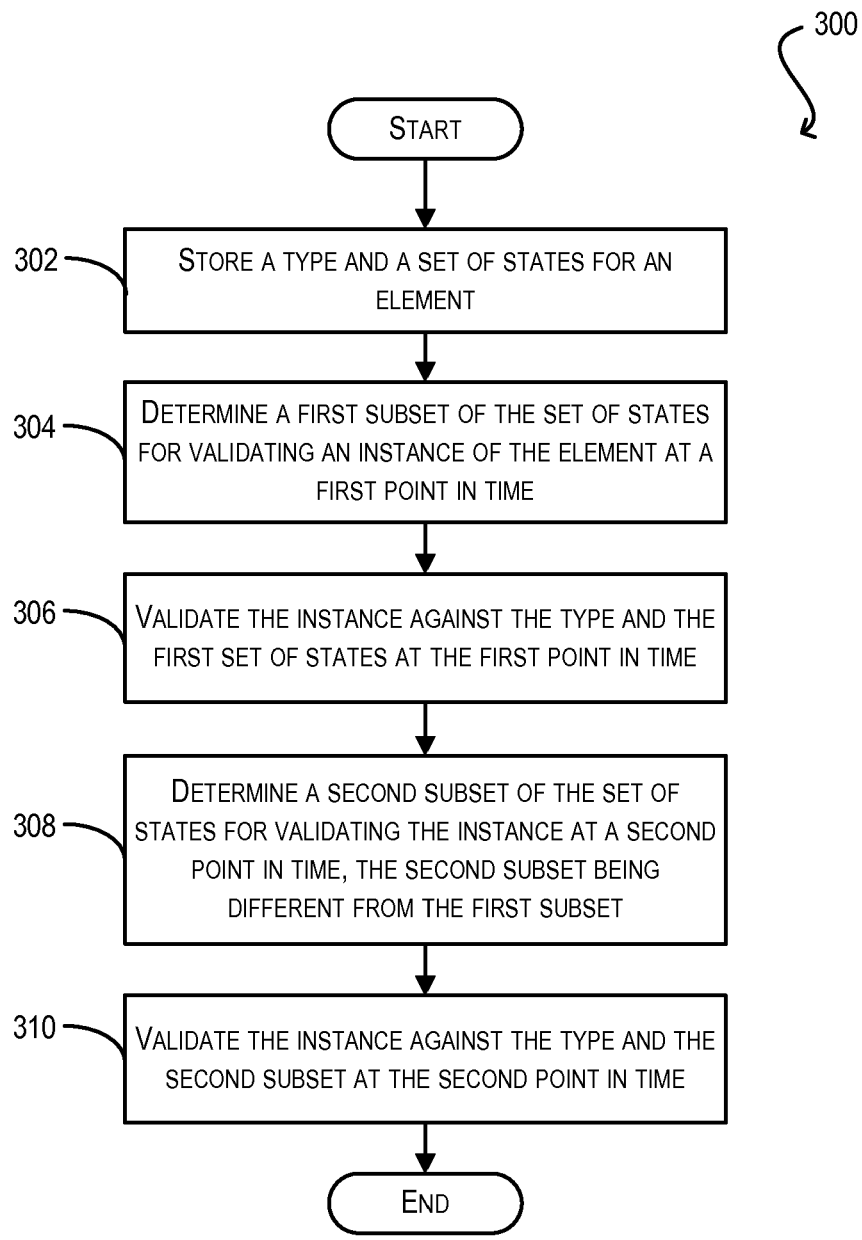
FIG. 3 is a flow diagram of a process for validating an XAP element instance according to an embodiment of the present invention.

FIG. 3 is a flow diagram of a process 300 for validating an XAP element instance (e.g., XML document instance) according to an embodiment of the present invention. In one set of embodiments, process 300 can be carried out by the XAP application/database engine running on server 106 or 108 of FIG. 1.

At block 302, a type and a set of states can be stored, where the type and set of states are associated with an XAP element. As noted above, the type can define a set of constraints that are always checked against instances of the element, whereas the states can define sets of constraints that may or may not be checked against an element instance at a particular point in time. In one set of embodiments, the name of the type can be identical to the name of element, while the names of the states can differ. By way of example, the "store:order" structure element described previously can have an associated type named "store:order" and, e.g., four associated states named "store:neworder," "store:paidorder," "store:shippedorder," and "store:closedorder" respectively.

At block 304, a first subset of the set of states can be determined for validating an instance of the element at a first point in time. In one set of embodiments, an XAP element instance/document can be validated upon being submitted as part of an XAP activity (described in further detail in the "Activities" section below). The definition for an XAP activity can specify (via an "output state" attribute) which state or states are active, and thus should be validated, when the activity is submitted. Accordingly, the determining at block 304 can correspond to determining, at the point of submitting an activity, which states are specified as active by that activity.

For example, assume that the "store:order" element instance described above has been entered into an XAP application via a "Take Order" activity, which specifies as its output state the "store:neworder" state. In this case, the first subset can be determined to include the "store:neworder" state. Once the first subset has been determined, the element instance can be validated against the type and the first subset at the first point in time (block 306). Thus, the "store:order" element instance can be validated against the "store:order" type and the "store:neworder" state upon submission of the "Take Order" activity (without validating the "store:paidorder," "store:shippedorder," or "store:closedorder" states).

At block 308, a second subset of the set of states can be determined for validating the instance at a second point in time, where the second subset is different from the first subset. For example, assume that the "store:order" element has now been paid via a "Bill Order" activity, which specifies the "store:paidorder" state as its output state. In this case, the second subset can be determined to include the "store:paidorder" state. Once the second subset has been determined, the instance can be validated against the type and the second subset at the second point in time (block 308). Thus, the "store:order" element instance can be validated against the "store:order" type and the "store:paidorder" state upon submission of the "Bill Order" activity (without validating the "store:neworder," "store:shippedorder," or "store:closedorder" states).

Blocks 304-308 can be iterated for additional downstream activities that modify the "store:order" element instance (e.g., "Ship Order," "Close Order," etc.). Thus, XAP can apply a varying set of constraints to the "store:order" instance (via different active states) over the instance's lifecycle. In certain embodiments, the base type "xap:order" can be always validated, regardless of which states are active.

In some embodiments, the XAP type system can include a variation of a state referred to as a "sticky state." As noted with respect to steps 304 and 308, the determination of which states are active for an element instance can be based on the output state for an activity; if a state is not listed as an output state, it will not be validated. When a particular state is marked as a sticky state, that state can be validated against an element instance/document every time the element instance/document is modified. In one set of embodiments, an activity can mark its own output state as sticky, thereby making the state active for all downstream activities, regardless of the output states of those activities. In another set of embodiments, an activity can take an existing state that was previously validated for an element instance/document and mark it as sticky. In yet another set of embodiments, an activity can remove sticky states that were previously stuck onto an element instance/document. In certain embodiments, an activity can have two output states (one sticky and one that is not), and these two states can be AND'ed together.

It should be appreciated that process 300 is illustrative and that variations and modifications are possible. Steps described as sequential may be executed in parallel, order of steps may be varied, and steps may be modified, combined, added, or omitted. One of ordinary skill in the art would recognize other variations, modifications, and alternatives.

Figure 4:
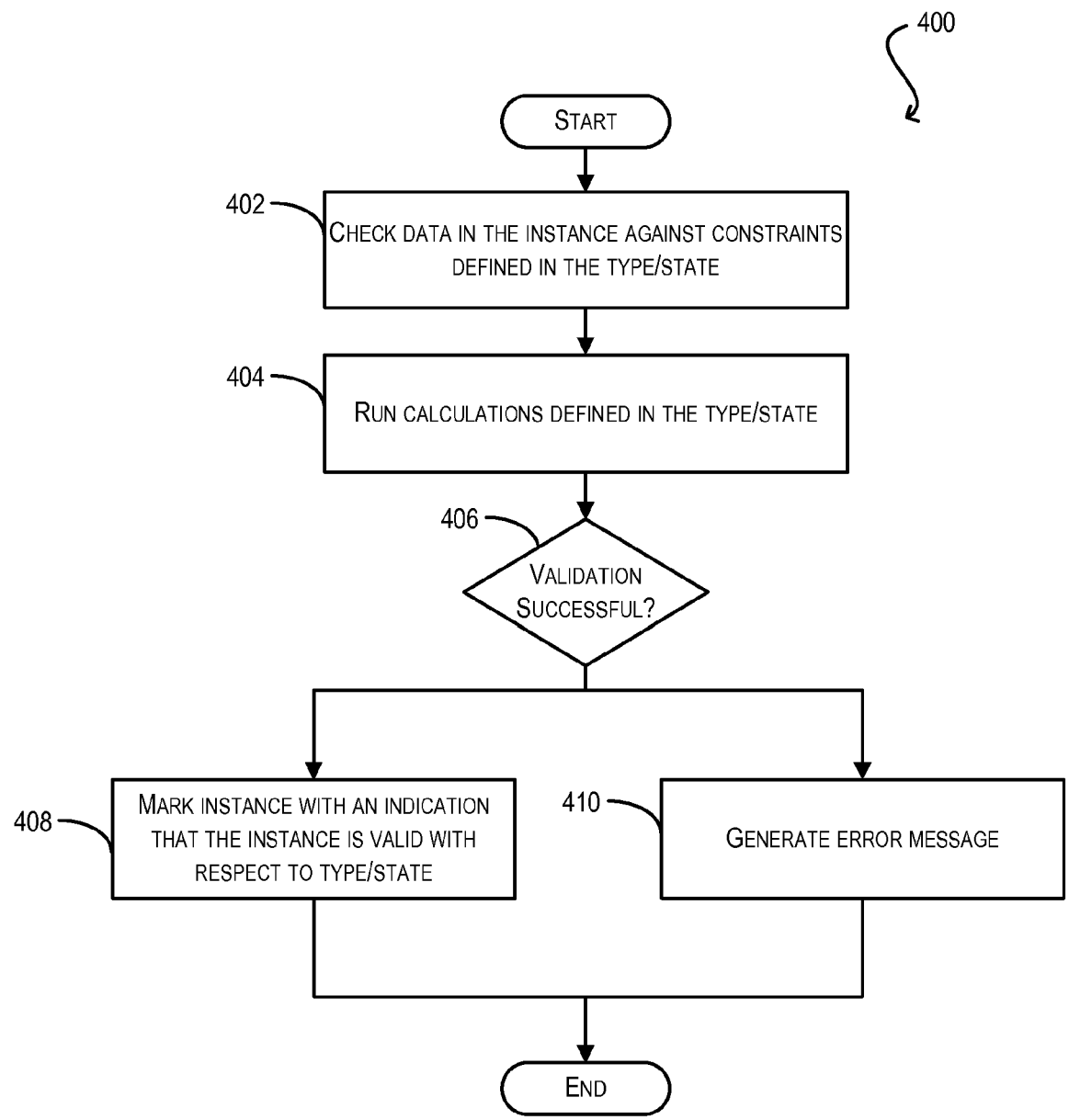
FIG. 4 is flow diagram of a process for validating an XAP element instance against a particular type/state according to an embodiment of the present invention.

FIG. 4 is a flow diagram of a process 400 for validating an element instance (e.g., XML document instance) against a particular type/state according to an embodiment of the present invention. In one set of embodiments, process 400 can be performed as part of blocks 306 and 310 of FIG. 3.

At block 402, data in the element instance can be checked against the constraints defined in the type/state. In one set of embodiments, a type/state can depend on a constraint being true or a constraint being false. In a specific embodiment, all of the constraints associated with a type/state must be satisfied in order for the type/state to be valid.

As part of the validation process, any calculations included in the type/state can also be executed (block 404). An XAP calculation is a formula that can be used to populate a particular scalar child element in a structure element instance with a computed value. For example, in the case of the "store:order" element, a calculation can be used to determine an "order total" that adds together the value of all order lines. XAP calculations are discussed in greater detail in the "Calculations" section below.

If the checking performed at block 402 is successful, the document storing the element instance can be marked with an indication that the instance is valid with respect to the type/state (blocks 406, 408). If the checking performed at step 404 is unsuccessful, an error message can be generated (blocks,

406, 410). In one set of embodiments, the error message can specifically identify the constraint or group of constraints that were not satisfied.

It should be appreciated that process 400 is illustrative and that variations and modifications are possible. Steps described as sequential may be executed in parallel, order of steps may be varied, and steps may be modified, combined, added, or omitted. One of ordinary skill in the art would recognize other variations, modifications, and alternatives.

Figure 5:
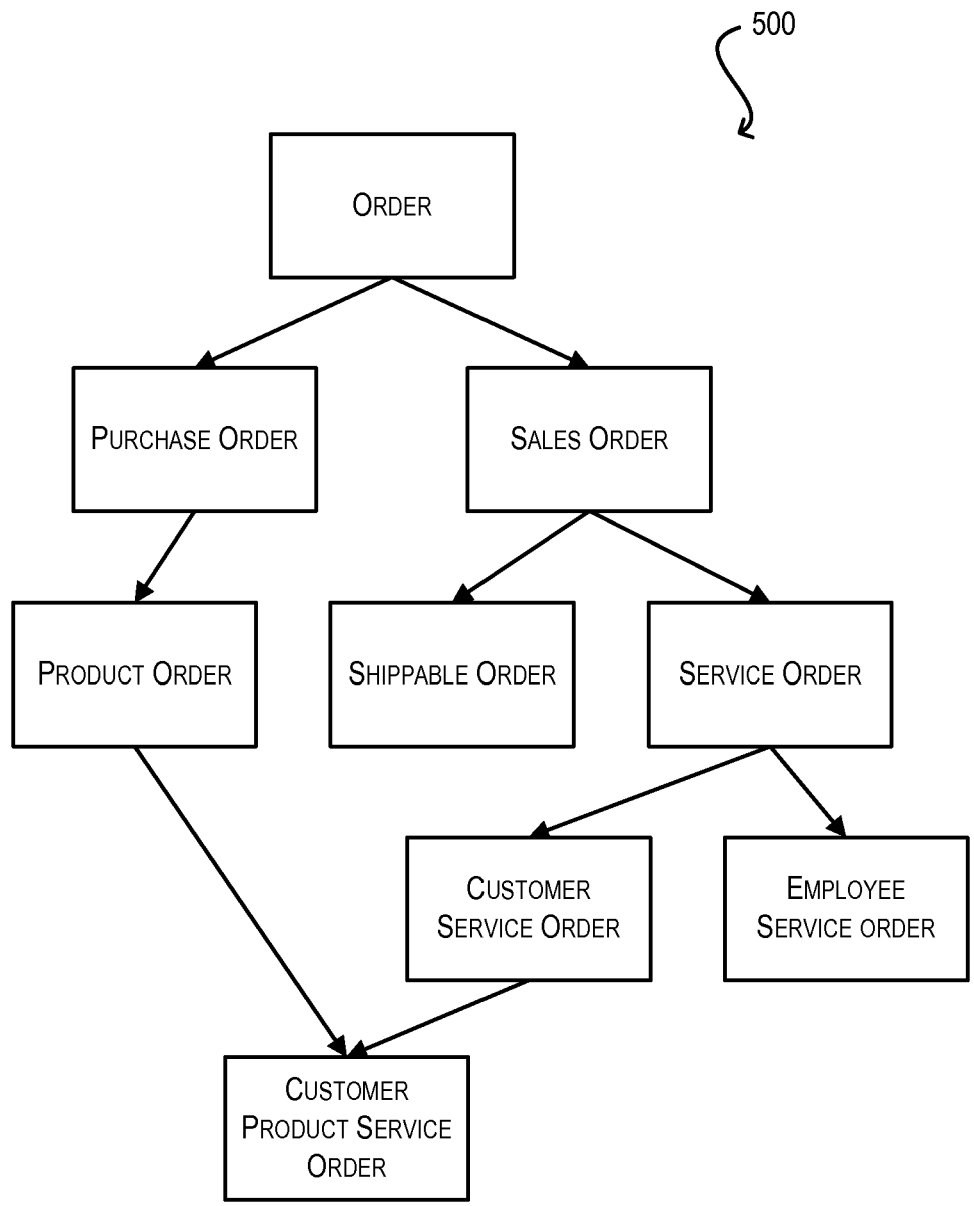
FIG. 5 is simplified block diagram of a type/state hierarchy according to an embodiment of the present invention.

In certain embodiments, XAP types and states can be organized into one or more type/state hierarchies, such that a child in a type/state hierarchy can inherit all of the semantics (e.g., constraints, calculations, etc.) of its parent. This feature allows a user to reuse and customize types and states defined by other users. FIG. 5 illustrates an example hierarchy 500. In this embodiment, hierarchy 500 supports multiple inheritance, such that the "Customer Product Service Order" state can inherit semantics from both the "Customer Service Order" state and the "Product Order" state.

2.5. Constraints

XAP can support a number of different types of predefined, declarative constraints, including:

Facets—Limits on the value of a scalar element;
Cardinality—Limits on the number of times a child element can appear within a parent element;
Compositional—Rules for composing constraints either within an element or across elements;
Referential—Checks on references to or from other elements;
Read-Only—Limits on what data can be changed during the preceding activity; and
Unique—Specifies that the value of a particular element is unique within a document; and
Coded—Open-ended constraints written in XQuery.

In one set of embodiments, XAP constraints can be expressed as XQuery expressions, and thus are also referred to herein as XQuery constraints.

2.5.1. Facets

Examples of facet constraints include "width," "range," "in," "precision," and "pattern." The width constraint can be used to place a minimum or maximum size on scalar elements of the string and binary datatypes. This can be used, for example, to place a maximum size on a text field in the XAP UI, such as address line.

The range constraint can place inclusive and/or exclusive upper and/or lower bounds on any scalar element, including those having numeric, date/time, string, and binary datatypes. As an example, an exclusive lower-bound range constraint can be used to require that a quantity be greater than zero.

An in constraint can define a list of values that a target scalar element should be a member of. Generally, the values should match the underlying datatype of the target scalar element.

Precision constraints can be used to specify the total number of significant digits for a numeric value, the number of digits following the radix, and/or the minimum rounding unit. For example, a precision constraint on a currency field can specify two digits following the radix for dollar denominations, and can further require rounding to the nearest nickel.

Pattern constraints can limit a string value to match a regular expression. For example, a zip code field can be limited to matching either the 5-digit zip or zip+4 standard using a regular expression.

2.5.2. Cardinality

Examples of cardinality constraints include "occurs," "choice," "union," and "group." The occurs constraint can set a specific minimum (minoccurs) or maximum (maxoccurs) number of occurrences for a child element in a parent element. This constraint can be used, for example, to require a child element (minoccurs=1), disallow a child element (maxoccurs=0), or limit a child element to a single value (maxoccurs=1).

The choice constraint can make a list of child elements mutually exclusive. This constraint can be useful whenever exactly one element from a list of children must appear. For example, a choice constraint can require either a Social Security Number (SSN) or an Employer Identification Number (EIN) to appear, but not both.

The union constraint can require at least one of a list of child elements to be present. For example, a union constraint can require either an email address or a telephone number. Unlike the choice constraint, both can be present.

The group constraint can require that all of a list of child elements be present as a set. This constraint can be useful whenever a subset of elements must appear together, or not at all. For example a group constraint can require a city element and a state element to appear together as a set.

2.5.3. Compositional

Examples of compositional constraints include "exists," "subelement-state," "subelement-validates," and "combining." The exists constraint can require that at least one instance of a descendant element is present. While the other compositional constraints apply only to the immediate children of an element, the exists constraint can specify a path that reaches down to nested child elements and requires at least one occurrence. In one set of embodiments, the exists constraint can be flagged as inverted, thereby requiring that there be no occurrences matching the path.

The subelement-state constraint can require that a child element be in (or not be in) a particular state. In certain embodiments, this can also constrain the type of the child. This provides a means whereby requirements can be cascaded down the hierarchy of an XAP structure element instance/document, or across elements in another document.

The subelement-validates constraint is similar to the subelement-state constraint, but can revalidate nested elements.

The combining constraint does not provide any validation by itself, but can be used to combine constraints according to "prerequisite" rules (described below).

2.5.4. Referential

Referential constraints apply to child scalar elements that are links. Examples of referential constraints include "scope," "acyclic," and "historic." A scope constraint can require that a link match (or not match) one of a set of links. In one set of embodiments, the scope constraint can use a link set that is defined by a path relative to another child of the same parent element. As an example, a scope constraint can be used to limit a <store:billto> link to point to an address that is one of the addresses found under a customer pointed to by a <store:purchaser> link. Note that scope constraints can be considered satisfied if the child element is not present; in other words, the scope constraint is only violated if the child element exists and points to something that is not in the link set. In certain embodiments, a scope constraint can be declared as inverted—that is, requiring that the child element not be in the link set. In these cases, the constraint is only violated if the child element exists and is in the link set.

An acyclic constraint can require that a link does not point back to the parent element along a specified path.

A historic constraint can require that a link point to a fixed (i.e., historic) version of a target element instance/document. In various embodiments, if a link is not constrained using the historic constraint, the link can point to the most current version of the target.

2.5.5. Read-Only

In one set of embodiments, the act of validating an element instance/document against a type/state occurs within the scope of a data modification (e.g., an activity). The read-only constraint can be used to mark elements that are not eligible to be changed. If the read-only constraint is used in a regular state, it can only prevent activities using that state as an output state from modifying the indicated elements (this can be used, for example, to make a field read-only for just one screen in a UI flow). If the read-only constraint is used in a sticky state, it can "lock" the indicated elements so that they cannot be modified by any downstream activities.

2.5.6. Unique

The unique constraint can be used to define a child element as unique within the context of a particular structure element instance/document. In one set of embodiments, uniqueness can be applied to a single child element or to multiple child elements as a concatenated unique key. For example, a unique constraint can require that the concatenation of last name, first name, and address for an employee element be unique.

2.5.7. Coded

A coded constraint is a block of code (e.g., an XQuery expression) that can be evaluated to yield a true or false value. In one set of embodiments, coded constraints can be used to define conditions across child elements. For example, a coded constraint can require that the quantity shipped in a "store: order" element be less than the quantity ordered. In certain embodiments, coded constraints can be side-effect free and produce consistent results purely as a function of their inputs.

2.5.8. Combining Constraints

In one set of embodiments, the XAP constraints described above can be declaratively combined into multi-constraint expressions based on boolean logic conditions. These multi-constraint expressions can then be associated with types/ states. Further, constraints can be ordered according to a "prereq" system, thereby allowing certain constraints in a multi-constraint expression to be evaluated before others.

In the prereq system, an XAP constraint can list zero or more other constraints as "prereqs," thereby declaring itself dependent on them. The XAP application/database engine can then check the prereq constraints before evaluating the dependent constraint. There are two keywords that can be used with a constraint to enable this functionality:

validates—the prereq is required to be true before the dependent constraint is evaluated.

rejects—the prereq is required to be false before the dependent constraint is validated.

In addition, there are two keywords that determine how the results of the prereq checks can be combined:

and—all of the prereqs must be satisfied (either validated true or validated false as necessary).

or—at least one of the prereqs must be satisfied.

In one set of embodiments, a constraint can be marked as having a "soft" dependency on its prereqs. This reverses the normal logic where XAP will consider a constraint to have failed, without evaluating it, if the prereqs are not satisfied. Instead, a soft constraint can be considered to have succeeded, without evaluating it, if the prereqs are not satisfied.

2.6. Calculations

An XAP calculation is an computational construct that can be associated with an XAP type or state. In particular, an XAP calculation specifies, in the context of a structure element, a scalar element child (the left-hand side, or LHS) that is assigned the result of evaluating an expression (the right-hand side, or RHS). Once a calculation is run on a specific element instance/document, the results of the calculation can be stored in the instance/document as data. Calculations can be used, for example, for providing "virtual" fields in an XAP application that are automatically populated/updated based on data entered in other fields. In certain embodiments, XAP calculations can be expressed as XQuery expressions, and thus are also referred to herein as XQuery calculations.

The following are examples of calculations that can be defined for the "store:order" element/type described previously:

price:=xap:deref(item)/price

Computes an item price by copying the list price of the item from the linked item instance total:=price*quantity Computes a line total as price times quantity total:=sum( . . . /total)

Compute the order total by adding up all the line totals

In certain embodiments, an XAP calculation is always defined relative to a particular parent element, and the LHS (i.e., the calculation target) is always an immediate child of that parent element. For example, in the examples above, the first and second calculations are defined relative to the "store: orderline" element, and the LHS of those calculations are immediate children of "store:orderline." The third calculation is defined relative to the "store:order" element, and the LHS side of that calculation is an immediate child of "store:order." In another set of embodiments, the LHS is local to the parent element (i.e., it cannot be a field in a linked document). The RHS (i.e., the formula) of a calculation can use both local and linked values (e.g., via the xap:deref( ) operator, as shown in the first calculation above).

In one set of embodiments, an XAP calculation can define an iteration context in which to evaluate the formula. The context can be a relative XPath (without predicates) that identifies a set of children on which to run the calculation. This allows a parent element to define a calculation farther down the structure hierarchy than its immediate children. For example, in the third calculation above, the formula "sum( . . . /total)" uses the context " . . . /" to downscope the summation to the level of "store:orderline" rather than "store:order." In certain embodiments, calculations defined by parent elements (through downscoping) can override calculations defined on children.

By default, XAP calculations can be run/re-run each time any data in the RHS is modified via the XAP UI. XAP calculations can also have the following predefined flags that allow a user to control the conditions under which they are run:

run only once—used for calculations that should not be repeated, like storing a timestamp on a document or assigning an ID to the document from a sequence.

run only if all RHS elements are present—used for instances where the calculation should not be run if all of the data it needs are not present. For example, if a calculation generates the city and state for an address based on the zip code, the calculation should not be run without the zip code.

run only on submission of the documents—only applicable in the context of an activity.

run only if there is no data already present in the LHS.

As described above with respect to the type/state hierarchy of FIG. 5, types/states can inherit calculations from their parents. If a type/state has conflicting calculation definitions for a particular LHS target element because of locally-defined and inherited calculations, the calculations can be run in the order of the type/state timestamp (e.g., newer states can have precedence over older ones, and calculations defined on the base type for an element can have the lowest precedence). The following is an example of a calculation that can exist on a sub-type of "store:order," overriding the normal method of calculating the price:

price:=xap:deref(item)/price*(1−xap:deref( . . . /billto)/discount)

Computes an item price by taking the list price and applying a customer discount 2.7. Activities XAP activities are application-level constructs that define the workflow of an XAP application. In particular, each XAP activity can correspond to a processing step in a business flow, such as "Take Order," "Bill Order," "Ship Order," and so on. Generally, an XAP activity is the means by which an end-user can make changes (e.g., add, edit, or remove data) to an element instance/document managed by XAP.

In one set of embodiments, each XAP activity can be associated with a UI screen in the XAP UI. Further, each activity can include, inter alia, an input query and an output state. The input query can be used to query XAP documents (e.g., element instances/XML document instances) that have a specific XAP type when the UI is first rendered. In addition, these documents can be filtered according to some filter criteria (e.g., retrieve all documents of "store:order" type that have been validated against the "store:paidorder" state). The result set that is returned by the input query can correspond to the set of data that needs to be acted upon in the context of the current activity.

In one set of embodiments, the input query for an activity can be a general XQuery (e.g., XQuery 1.0 with no scripting or update) or an XAP declarative query. XAP declarative queries are designed to facilitate basic workflow and query definitions using the XAP UI. In certain embodiments, the UI for defining an XAP declarative query can automatically filter out documents that have already been validated with the output state of the current activity. Further, the UI can specify a list of states to check for that have been processed already, and specify a list of immediate children, operators, and constants for creating simple (field <operator> constant) query criteria that can be AND'ed together.

The output state for an activity can specify the XAP state that will be checked once the activity has been completed and any modified documents are submitted. Submitting a document can cause the document to be validated against the base type and the output state, cause any calculations to be run, publish the changes (i.e., create a major version) so that they are visible to other XAP users, and mark the document with an indication that the output state has been validated.

Figure 6:
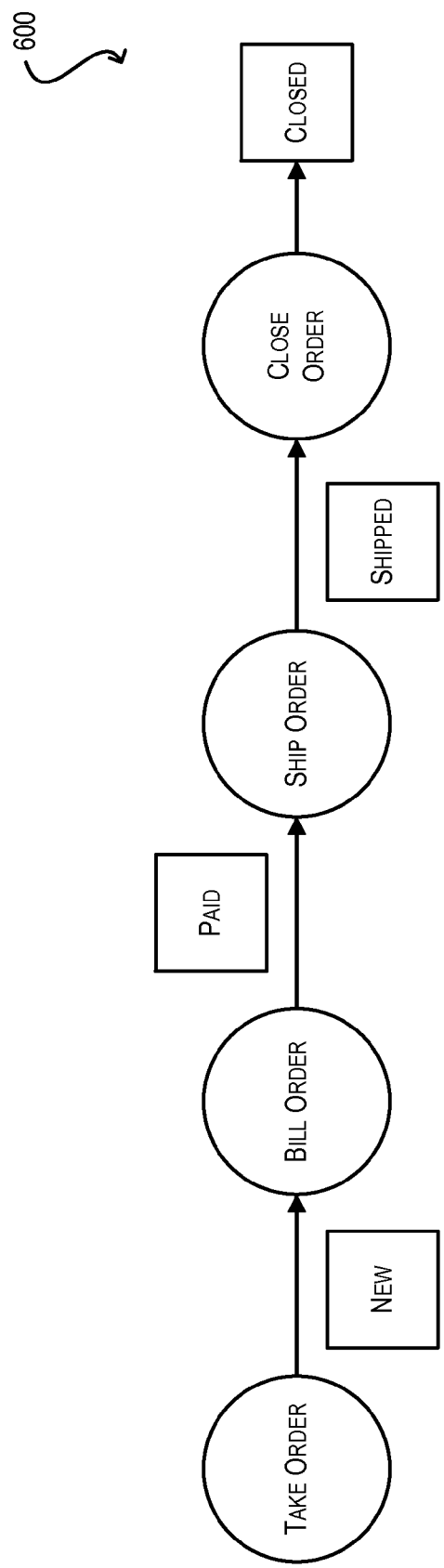
FIG. 6 is a simplified block diagram of an XAP application flow according to an embodiment of the present invention.

FIG. 6 is a simplified block diagram illustrating a workflow 600 for an exemplary XAP application using states and activities. As shown, the states that have been defined for this application (denoted by circles) are "New," "Paid," "Shipped," and "Closed," and the activities that have been defined for this application (denoted by squares) are "Take Order," "Bill Order," "Ship Order," and "Close Order." Assume that the base type for the information being managed is "Order."

In one set of embodiments, the "Take Order" activity can have a null input query and can specify its output state as "New." Thus, when the sheet corresponding to the "Take Order" activity is rendered, an empty sheet can be presented to a user for entering new order data. Once the user has entered order data and indicated completion of the "Take Order" activity, the XAP engine can validate the data against the "New" state that is defined as the output state. For example, the XAP engine can check that each new order document has an order number. The XAP engine can then mark the documents as being in the "New" state and store the updated documents in the shared XAP database for further processing.

The "Bill Order" activity can have an input query that retrieves all documents of "Order" type that have been validated against the "New" state (but not validated against other states), and can specify its output state as "Paid." Thus, when the sheet corresponding to the "Bill Order" activity is rendered, the sheet can display all of the orders in the system that have been entered but have not yet been billed. Once a user has modified the order data appropriately and indicated completion of the "Bill Order" activity, the XAP engine can validate the modified data against the "Paid" state that is defined as the output state. For example, the XAP engine can check that each order document has billing information. The XAP engine can then mark the documents as being in the "Paid" state and store the updated documents in the shared XAP database for further processing.

The "Ship Order" activity can have an input query that retrieves all documents of "Order" type that have been validated against the "Paid" state (but not validated against the "Shipped" state), and can specify its output state as "Shipped." Thus, when the sheet corresponding to the "Ship Order" activity is rendered, the sheet can display all of the orders in the system that have been paid but have not yet been shipped. Once a user has modified the order data appropriately and indicated completion of the "Ship Order" activity, the XAP engine can validate the modified data against the "Shipped" state that is defined as the output state. For example, the XAP engine can check that each order document has a delivery tracking number. The XAP engine can then mark the documents as being in the "Shipped" state and store the updated documents in the shared XAP database for further processing.

Finally, "Close Order" activity can have an input query that retrieves all documents of "Order" type that have been validated against the "Shipped" state (but not validated against the "Closed" state), and can specify its output state as "Closed." Thus, when the sheet corresponding to the "Close Order" activity is rendered, the sheet can display all of the orders in the system that have been shipped but have not yet been closed. Once a user has modified the order data appropriately and indicated completion of the "Close Order" activity, the XAP engine can validate the modified data against the "Closed" state that is defined as the output state. For example, the XAP engine can check that each order document includes an indication that the order has been received. The XAP engine can then mark the documents as being in the "Closed" state and store the updated documents in the shared XAP database.

In the example of FIG. 6, all of the activities can be human activities in the sense that humans are required to enter or modify the data returned by the input query via the XAP UI. For these types of activities, the XAP UI can continuously run any calculations defined by the base type or state (like a conventional spreadsheet) by automatically filling in LHS elements in the UI as data is entered into dependent fields. Further, the XAP UI can continuously check constraints defined by the output state, so that a user can be alerted of validation errors while typing (as opposed to providing those errors after the documents are submitted).

XAP can also support computer activities, which are activities that can be automated or semi-automated via program code (e.g., XQuery scripting code). In one set of embodiments, a computer activity can modify any documents in the shared XAP database, and/or call out to external Web services. If, for example, an XQuery code block in a computer activity calls the xap:submit( ) extension function to handle document submission, the XQuery code can catch any exceptions that occur from the output state validation. If the XQuery code cannot correct all of the exceptions found by the output state validation, the documents can be marked so that they can be later queried by a human user to resolve the errors.

Although specific embodiments of the invention have been described above, various modifications, alterations, alternative constructions, and equivalents are within the scope of the invention. For example, XAP is not restricted to use in an enterprise environment, and can be used to build any type of application flow that runs on top of a shared database. Further, although embodiments of the present invention have been described with respect to certain flow diagrams and steps, it should be apparent to those skilled in the art that the scope of the present invention is not limited to the described flow diagrams and steps.

Yet further, although embodiments of the present invention have been described using a particular combination of hardware and software, it should be recognized that other combinations of hardware and software are also within the scope of the present invention.

The specification and drawings are, accordingly, to be regarded in a illustrative rather than restrictive sense. It will be evident that additions, subtractions, and other modifications may be made thereunto without departing from the broader spirit and scope of the invention as set forth in the following claims.

The invention claimed is:

1. A computer-implemented method comprising:
    storing elements that describe element instances that can occur in a collection of hierarchical data objects;
    wherein said collection of hierarchical data objects includes a hierarchical data object that contains particular element instances;
        wherein for each particular element instance of said particular element instances, a particular element of said elements that describes said particular element instance defines one or more constraints, each constraint of said one or more constraints being active or inactive at a particular point in time for said each particular element instance; and
    at a first point in time, validating the hierarchical data object against the elements, wherein validating the hierarchical data object includes:
        for a certain element instance of said particular element instances:
            from among constraints defined by a certain element of said elements that describes said certain element instance, determining a first set of one or more constraints that are active for said certain element instance; and
            in response to determining the first set of one or more constraints that are active, validating said certain element instance based on the first set of one or more constraints.

2. The method of claim 1, further comprising:
    at a second point in time, validating the hierarchical data object against the elements, wherein validating the hierarchical data object includes:
        for said certain element instance of said particular element instances:
            from among the constraints defined by the certain element of said elements that describes said certain element instance, determining a second set of one or more constraints that are active for said certain element instance; and
            in response to determining the second set of one or more constraints that are active, validating said certain element instance based on the second set of one or more constraints.

3. The method of claim 1, wherein for said certain element instance of said particular element instances, the certain element of said elements that describes said certain element instance defines one or more calculations that are each active or inactive at a particular point in time for said certain element instance, wherein validating the hierarchical data object includes:
    for said certain element instance of said particular element instances:
        from among the one or more calculations defined by the certain element of said elements that describes said certain element instance, determining a first set of one or more calculations that are active for said certain element instance; and
        in response to determining the first set of one or more calculations that are active, validating said certain element instance based on the first set of one or more calculations.

4. The method of claim 3, wherein for a particular calculation of said first set of one or more calculations, a result of said particular calculation is stored in a child element instance of said certain element instance.

5. The method of claim 1, wherein each constraint of said first set of one or more constraints is expressed by the certain element that describes said certain element instance in XQuery.

6. The method of claim 3, wherein each calculation of said first set of one or more calculations is expressed by the certain element that describes said certain element instance in XQuery.

7. The method of claim 1, wherein said elements include an element of which there is no element instance in the hierarchical data object.

8. The method of claim 1, wherein each element of said elements defines a respective plurality of states, each state of said respective plurality of states defines one or more constraints.

9. The method of claim 8, wherein determining the first set of one or more constraints that are active for said certain element instance includes determining that a particular state defining said first set of one or more constraints is active for said certain element instance.

10. The method of claim 1, wherein if the hierarchical data object is successfully validated at the first point in time, the hierarchical data object is marked with information indicating that the hierarchical data object is valid with respect to a particular state.

11. A non-transitory computer-readable medium storing instructions which, when executed by one or more processors, cause:
    storing elements that describe element instances that can occur in a collection of hierarchical data objects;
    wherein said collection of hierarchical data objects includes a hierarchical data object that contains particular element instances;
        wherein for each particular element instance of said particular element instances, a particular element of said elements that describes said particular element instance defines one or more constraints, each constraint of said one or more constraints being active or inactive at a particular point in time for said each particular element instance; and at a first point in time, validating the hierarchical data object against the elements, wherein validating the hierarchical data object includes:
for a certain element instance of said particular element instances:
from among constraints defined by a certain element of said elements that describes said certain element instance, determining a first set of one or more constraints that are active for said certain element instance; and
in response to determining the first set of one or more constraints that are active, validating said certain element instance based on the first set of one or more constraints.

12. The non-transitory computer-readable medium of claim 11, wherein the instructions further comprise instructions for:
at a second point in time, validating the hierarchical data object against the elements, wherein validating the hierarchical data object includes:
for said certain element instance of said particular element instances:
from among the constraints defined by the certain element of said elements that describes said certain element instance, determining a second set of one or more constraints that are active for said certain element instance; and
in response to determining the second set of one or more constraints that are active, validating said certain element instance based on the second set of one or more constraints.

13. The non-transitory computer-readable medium of claim 11, wherein for said certain element instance of said particular element instances, the certain element of said elements that describes said certain element instance defines one or more calculations that are each active or inactive at a particular point in time for said certain element instance, wherein validating the hierarchical data object includes:
for said certain element instance of said particular element instances:
from among the one or more calculations defined by the certain element of said elements that describes said certain element instance, determining a first set of one or more calculations that are active for said certain element instance; and
in response to determining the first set of one or more calculations that are active, validating said certain element instance based on the first set of one or more calculations.

14. The non-transitory computer-readable medium of claim 13, wherein for a particular calculation of said first set of one or more calculations, a result of said particular calculation is stored in a child element instance of said certain element instance.

15. The non-transitory computer-readable medium of claim 11, wherein each constraint of said first set of one or more constraints is expressed by the certain element that describes said certain element instance in XQuery.

16. The non-transitory computer-readable medium of claim 13, wherein each calculation of said first set of one or more calculations is expressed by the certain element that describes said certain element instance in XQuery.

17. The non-transitory computer-readable medium of claim 11, wherein said elements include an element of which there is no element instance in the hierarchical data object.

18. The non-transitory computer-readable medium of claim 11, wherein each element of said elements defines a respective plurality of states, each state of said respective plurality of states defines one or more constraints.

19. The non-transitory computer-readable medium of claim 18, wherein determining the first set of one or more constraints that are active for said certain element instance includes determining that a particular state defining said first set of one or more constraints is active for said certain element instance.

20. The non-transitory computer-readable medium of claim 11, wherein if the hierarchical data object is successfully validated at the first point in time, the hierarchical data object is marked with information indicating that the hierarchical data object is valid with respect to a particular state.

* * * * *

UNITED STATES PATENT AND TRADEMARK OFFICE
CERTIFICATE OF CORRECTION

PATENT NO. : 8,924,416 B2  
APPLICATION NO. : 13/923033  
DATED : December 30, 2014  
INVENTOR(S) : Sedlar et al.

Page 1 of 1

It is certified that error appears in the above-identified patent and that said Letters Patent is hereby corrected as shown below:

In the Specification

In column 9, line 59, delete "grommet xml" and insert -- grommet.xml --, therefor.

In the Claims

In column 19, line 40, in Claim 1, delete "contraints" and insert -- constraints --, therefor.

Signed and Sealed this
First Day of September, 2015

Michelle K. Lee
*Director of the United States Patent and Trademark Office*